United States Patent
Murray

(10) Patent No.: US 6,568,842 B1
(45) Date of Patent: May 27, 2003

(54) HIGH CAPACITY MOBILE LIME SLAKER

(75) Inventor: Richard D. Murray, Dallas, TX (US)

(73) Assignee: United States Lime and Minerals, Inc., Dallas, TX (US)

( * ) Notice: Subject to any disclaimer, the term of this patent is extended or adjusted under 35 U.S.C. 154(b) by 0 days.

(21) Appl. No.: 09/592,334

(22) Filed: Jun. 13, 2000

(51) Int. Cl.$^7$ .............................. B01F 15/02; E04B 2/04; E01F 2/08
(52) U.S. Cl. ..................... 366/137; 366/163.2; 366/341; 366/2; 366/40; 366/34; 423/460; 422/162; 422/234
(58) Field of Search ............................ 366/163.2, 163.1, 366/339, 340, 341, 136, 137, 165.1, 156.1, 156.2, 157.2, 2; 422/162, 234; 423/640, 636

(56) References Cited

U.S. PATENT DOCUMENTS

| | | | |
|---|---|---|---|
| 3,854,968 A | | 12/1974 | Minnick et al. |
| 4,233,015 A | | 11/1980 | Teague et al. |
| 4,261,953 A | | 4/1981 | Gisler |
| 4,382,911 A | | 5/1983 | Pennell et al. |
| 4,401,645 A | | 8/1983 | Gisler |
| 4,436,703 A | * | 3/1984 | Lane |
| 4,547,349 A | * | 10/1985 | Lane |
| 4,595,576 A | | 6/1986 | Andreasen et al. |
| 4,779,992 A | | 10/1988 | Underwoodl |
| 4,863,277 A | * | 9/1989 | Neal et al. |
| 5,332,436 A | | 7/1994 | Walker, Jr. et al. |
| 5,336,481 A | * | 8/1994 | Muzik et al. |
| 5,344,619 A | * | 9/1994 | Larwick et al. |
| 5,368,731 A | * | 11/1994 | Pesotini |
| 5,544,971 A | | 8/1996 | Huege et al. |
| 5,580,168 A | * | 12/1996 | Alireza et al. |
| 5,642,939 A | * | 7/1997 | Comardo |
| 5,746,983 A | * | 5/1998 | Stephansen |
| 5,792,440 A | | 8/1998 | Huegal |
| 5,857,773 A | * | 1/1999 | Tammelin |
| 5,876,689 A | | 3/1999 | Webeling et al. |
| 5,947,596 A | * | 9/1999 | Dowd |

\* cited by examiner

*Primary Examiner*—Tony G. Soohoo
(74) *Attorney, Agent, or Firm*—Thompson & Knight LLP; David C. Cain

(57) ABSTRACT

A continuous preparation of calcium hydroxide slurry can be made on a mobile apparatus that uses an eductor to initially combine metered flows of calcium oxide and water. The calcium hydroxide slurry is retained in a deaerating sump and then pumped into a serpentine centrifugal mixer so that the reaction of the calcium oxide and the water is safely complete. Because the apparatus allows the calcium hydroxide slurry to be recirculated into the deaerating sump, the slaking process can continue even when it is necessary to pause the discharge of slurry to change transport tankers.

6 Claims, 2 Drawing Sheets

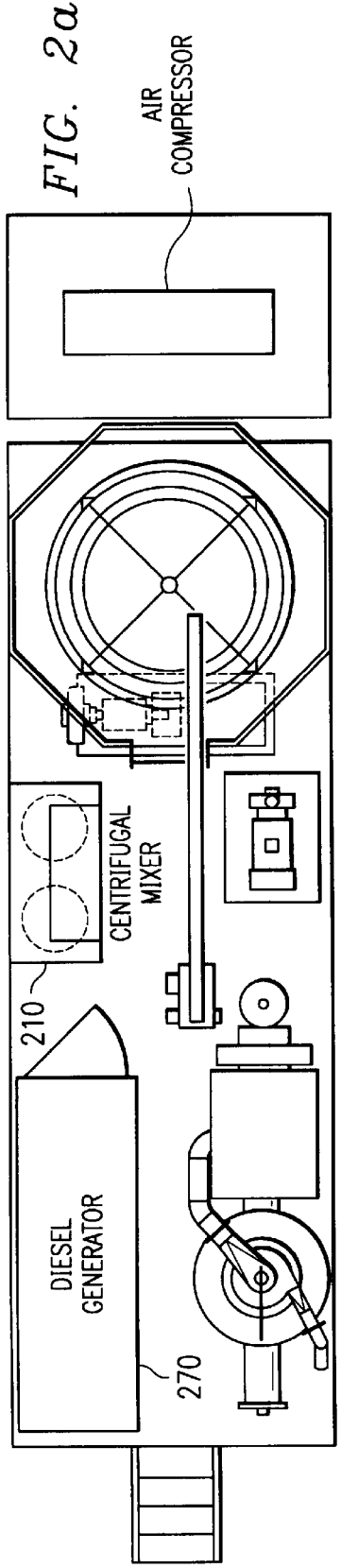
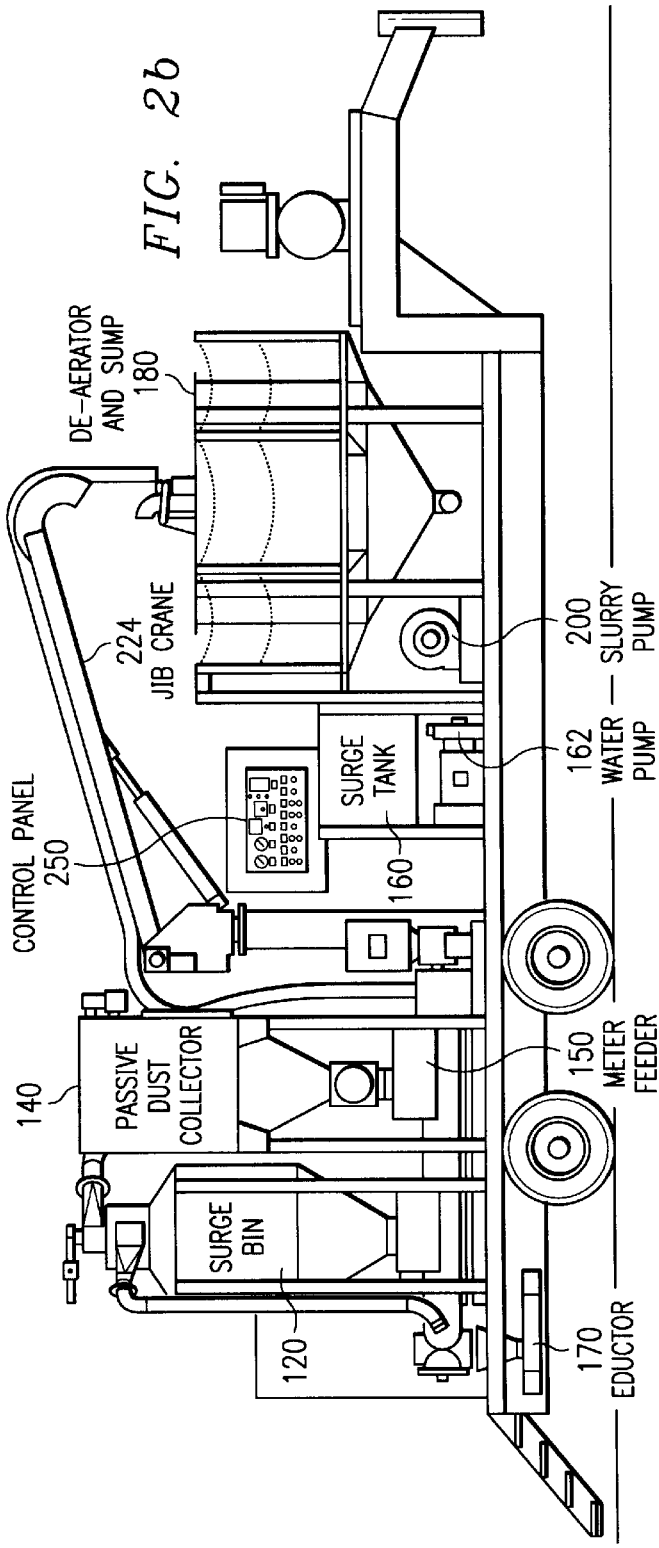

HIGH CAPACITY MOBILE LIME SLAKER

FIELD OF THE INVENTION

The invention relates to a method and apparatus for the preparation of calcium hydroxide, in particular for a mobile system that facilitates the continuous preparation of calcium hydroxide slurry from calcium oxide and water at a jobsite location.

BACKGROUND OF THE INVENTION

The use of calcium hydroxide slurries to stabilize clay soils in highway and general construction projects is well established.

When preparing calcium hydroxide slurry by mixing calcium oxide and water together, a highly exothermic reaction takes place. Generally apparatus designed for this process have been of a batch nature, or a limited capacity continuous process.

What is therefore needed is a slaking and mixing apparatus that is mobile.

What is also needed is a slaking and mixing apparatus capable of processing high hourly volumes and servicing a fleet of mobile slurry spreading tankers through high volume intermittent output from the apparatus.

SUMMARY OF THE INVENTION

It is therefore an object of the invention to provide an apparatus to continuously process high volumes of calcium oxide up to a rate approximating 30 tons per hour.

Another object of the invention is to provide a continuous slurrying/slaking process which has provision to discharge either into a static slurry storage tank, or to discharge intermittently into a fleet of mobile tankers for spreading the product at the jobsite Another object of the invention is to provide an apparatus that allows for accurate and infinitely variable consistency of the product slurry as measured in percentage solids.

Another object of the invention is to provide an apparatus that can be mounted on a trailer, easily moved to a job site and set up in a minimal time.

Another object of the invention is to provide a lime slaker that requires only a source of water, a commercial lime delivery, and slurry distribution trucks or a storage tank for production. In this way, the slaker can be used economically on smaller jobs where current methods cannot be justified because of the high set-up costs.

Another object of the invention is to provide an apparatus that permits accurate blending of calcium oxide and water in a continuous process that can produce limited quantities of lime slurry necessary for small job site, or larger quantities of lime slurry for larger job sites.

Another object of the invention is to provide an apparatus capable of producing high shear and turbulent mixing of calcium oxide and water through the use of an eductor designed to promote initial mixing, agitation in the system tanks created by high velocity streams from the system pumps directed through specifically designed flow devices to achieve maxium turbulence, high shear mixing within the slurry pump and differential velocity mixing in the serpentine centrifugal mixer.

According to one aspect of the invention, the equipment is fully mobile, self-contained and designed to be pulled by a small pick-up truck requiring only delivery of the two chemical components, calcium oxide and water, at the jobsite.

According to one aspect of the invention, the apparatus includes variable and accurate dosing of the chemical components, thus ensuring the required slurry consistency.

According to one aspect of the invention, the apparatus includes an eductor to provide intimate mixing of the two chemical components.

According to one aspect of the invention, a serpentine centrifugal mixer is used to achieve a high shear rate between the components of the slurry, thus ensuring full conversion of the calcium oxide to calcium hydroxide.

According to another aspect of the invention, the calcium oxide and water mixture is subjected to pressure during the later stages of hydration, forcing water into any remaining unhydrated particles, assuring complete. hydration.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

FIGS. 2 and 2B is a plan view, and a side elevation view of the equipment in its field operation arrangement, in accordance with the invention.

DETAILED DESCRIPTION OF THE PREFERRED EMBODIMENT

Figure 1:
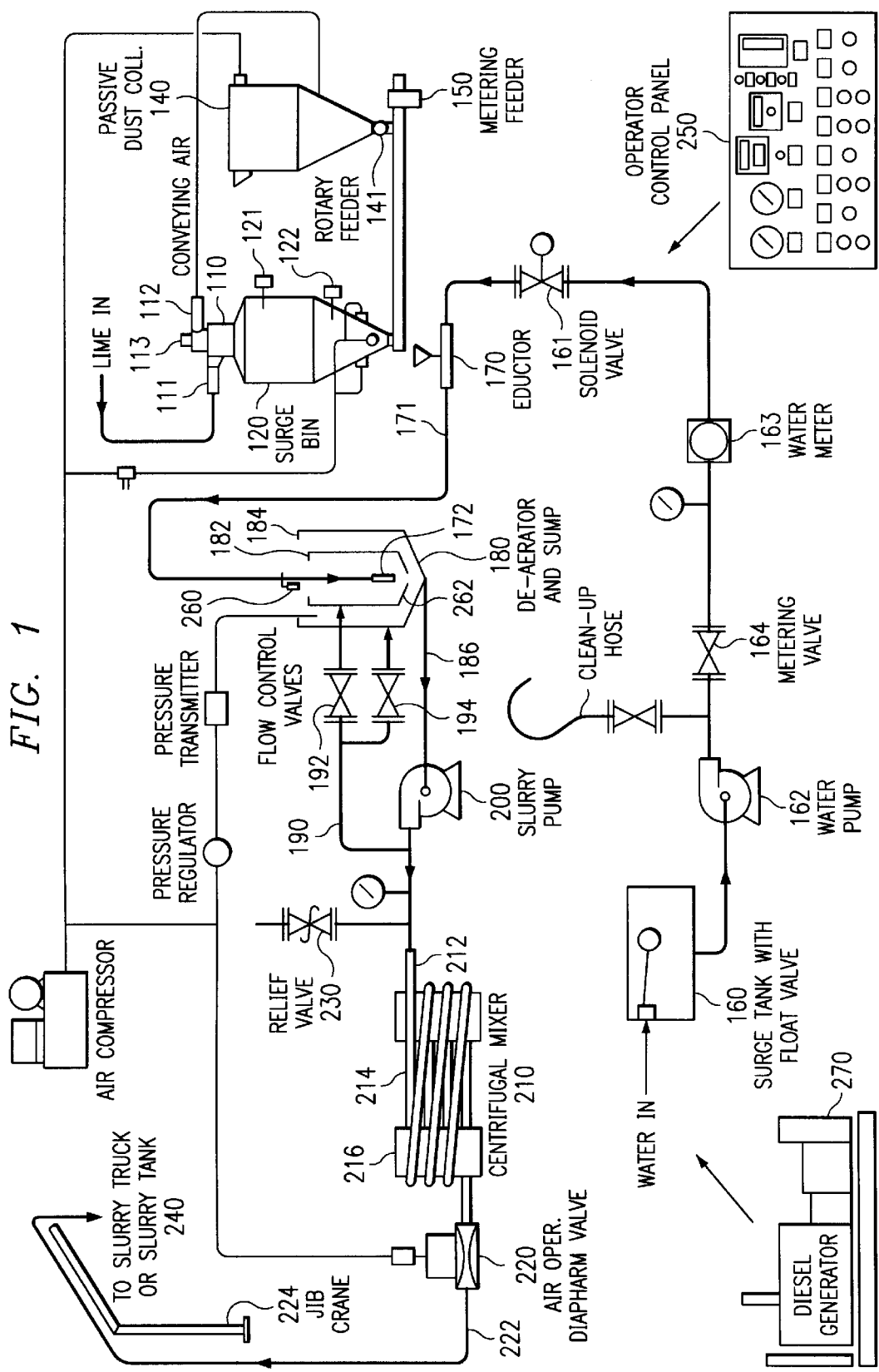
FIG. 1 is a process flow diagram in accordance with the invention.

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

In accordance with the preferred embodiment, the mobile lime slaker is transported to or near a jobsite. Calcium oxide is delivered to the mobile lime slaker in dry powder or pebble form, generally in a bulk road tanker (not shown).

The calcium oxide is discharged from the bulk road tanker by blowing the dry powder or pebbles through a cyclone inlet 111 into a cyclone 110, which separates the solid particles from the conveying air. The cyclone inlet 111 is fitted with a pressure relief valve 113 to prevent system over-pressures by the conveying air. The cyclone 110 deposits the calcium oxide into a surge bin 120. The surge bin 120 stockpiles the calcium oxide so that the flow of calcium oxide can be regulated and continuous.

For safety reasons, the level of calcium oxide present in the surge bin 120 is monitored with a high-level alarm 121 to alert the operator when the level of calcium oxide in the surge bin 120 exceeds a predetermined level so that the operator can stop or adjust the flow into the surge bin 120.

As the calcium oxide is discharged through the cyclone 110, air is discharged from the cyclone 110 through a cyclone outlet 112 into a passive dust collector 140. The passive dust collector 140 removes dust particles and deposits them through a rotary feeder 141 into a metering feeder 150 capable of maintaining a constant-bulk density of the calcium oxide, preferably a vibrating screw feeder. The air is thereby left substantially free of dust particles, and so can be discharged into the atmosphere.

Calcium oxide from the surge bin 120 is discharged into the vibrating screw feeder 150 where it combines with calcium oxide from the dust collector 140 to completely fill the vibrating screw feeder 150. The vibrating screw feeder 150 may be electrically driven. Furthermore, the vibrating screw feeder 150 may have variable speed control. An electrically driven vibrating screw feeder 150 with a variable speed control advantageously allows the feed rate of calcium oxide to be varied accurately so that the proper slurry mixture can be consistently delivered.

A low-level measuring device 122 in the surge bin 120 automatically stops both the vibrating screw feeder 150 and the water supply through the solenoid valve 161 when the level of calcium oxide solids in the surge bin 120 reaches the preset minimum level. A timer is incorporated so that the minimum level must be detected continuously for an adjustible period of time before the feeder and water supply are stopped. The timer prevents transient conditions from shutting down the process.

Calcium oxide is mixed with water by means of an eductor 170. The eductor 170 is a device that uses high-pressure water supplied through the solenoid valve 161 to create suction. This suction draws calcium oxide from the vibrating screw feeder 150 into the line where the calcium oxide is mixed with water to form calcium hydroxide.

Water for the eductor 170 is supplied from a reservoir or surge tank 160 that allows a controlled supply to the water pump 162. The water could be transported to the jobsite, or drawn from a nearby hydrant, creek, pond or similar source. Water is drawn from the reservoir tank 160 and pressure is developed through a water pump 162. Accurate metering of the water is provided by a turbine flow meter 163. The turbine flow meter 163 controls a metering valve 164. The turbine flow meter 163 and metering valve 164 allow an operator to determine and control the flow of water being mixed with the calcium oxide in the eductor 170. In this way, the percentage of calcium oxide and water in the final solids composition of the slurry can be controlled.

Discharge from the eductor 170 flows by means of a pipeline 171 into the deaerating sump 180, where further mixing of the calcium oxide and water allows the slaking reaction, which transforms the calcium oxide into calcium hydroxide during a controlled retention period. The deaerating sump 180 is a double-walled tank to maximize the retention time for the slurry while the slaking reaction proceeds. Slurry from the inner tank 182 overflows into the outer tank 184, and the retention time created by the overflow process is sufficient to allow the slaking reaction to be significantly advanced.

Good mixing of the solids and water are required to allow the slaking reaction to proceed rapidly and this is achieved through a conical-shaped valve 172 at the base of the discharge pipeline 171 in the inner tank 182 of sump 180. The conical-shaped valve 172 creates a circular motion of the fluids due to the shape of the valve. This motion, volume and pressure of the incoming mixture impinging upon the valve produces a high degree of agitation.

Further agitation of the slurry is provided by a positive slurry feedback circuit 190. The flow control valves 192 and 194 recirculate a proportion of the slurry that has been discharged back into deaerating sump 180. The slurry pump 200 forces the recirculated slurry under pressure into the inner tank 182 through flow control valve 192 and into the outer tank through flow control valve 194. This recirculation causes further intimate mixing to take place while assisting the safe dispersion of the heat generated in the exothermic reaction by the sump tank 180 being open to the atmosphere.

Slurry discharged from the deaerating sump 180 moves through a sump outlet 186 in the base of the outer tank 184. The slurry is pulled under suction into a slurry pump 200 which develops pressure in order to force the discharge of slurry from the slaking operation. A proportion of the slurry exiting the pump 200 is diverted through flow control valves 192 and 194, back into the deaerating sump 180 to provide the agitation and mixing of the materials without the requirement for mechanical agitation equipment in this chemically aggressive and difficult environment.

The slurry pump 200 forces the slurry, which is still reacting to some degree, into a serpentine centrifugal mixer 210 consisting of a tube 212 turned into a number of coils 214 around a fixed form 216. Forcing the slurry through a series of turns creates high shear mixing under pressure that further breaks down any still reacting particles in the slurry and ensures continuation of the slaking reaction.

The slurry exits the serpentine centrifugal mixer 210 through an air-operated diaphragm valve 220. The valve 220 controls the flow of slurry to maintain a pre-set level in the outer tank 184. The slurry is finally carried out of the mobile lime slaker by means of a discharge hose 222 attached to a jib crane 224 that can be turned to either side of the mobile lime slaker or put into a position to recycle the slurry in a holding pattern within the system.

To achieve full slurry recirculation, the air-operated diaphragm valve 220 is temporarily closed and the discharge hose 222 attached to a jib crane 224 is rotated to recirculate the slurry into the deaerating sump 180 at which point diaphragm valve 220 is reopened and the slurry goes in a continuous loop without being discharged from the equipment. When the next receiving tank 240 is in place, the diaphragm valve 220 is again closed while the discharge hose 222 is placed in position to discharge into the tanker 240 and valve 220 is reopened to allow continuation of the discharge process.

Most typically, slurry is taken away from the mobile lime slaker 100 in road delivery tankers 240 to the jobsite and there is a period of time between the departure of one vehicle and the setting up of the next when it is not possible to discharge slurry, but in view of the dangerous nature of the exothermic reaction, it is not advisable to stop the flow of material.

A pressure relief valve 230 is provided should a malfunction cause the slurry pump 200 to stop while the lines are full.

Control for the process is preferably provided through electrical sensors and speed controls, solenoid valves and instrumentation operated by a generating set which is mounted as an integral part of the apparatus and allows a single operator to maintain control of all aspects of the equipment from a central control panel 250 mounted upon the apparatus 100. Electrical power for the system's electrical components is preferably provided by a diesel generator 270.

The entire unit can be mounted on a trailer. In this way the unit can be transported to a job site, and set up in a minimal amount of time. Operation of the slaker in accordance with the present invention requires only a source of water, a commercial lime delivery and slurry distribution trucks, or a storage tank to begin production. On larger jobs, a storage tank may be incorporated at the site to allow for continuous production. The unit can, thus, be used economically on small jobs where current methods cannot be justified because of high set-up costs.

Following use, it is essential to drain-down and wash out all the equipment to prevent a build-up of lime scale. The achieve this, the conical mixing valve 172 can be raised by means of an air cylinder 260 exposing a discharge opening 262 in the base of the inner tank 182 of the deaerating sump 180 through which slurry and wash-down water can access the slurry pump 200 and be discharged.

Although the invention has been described with a certain degree of particularity, it should be recognized that elements thereof may be altered by persons skilled in the art without departing from the spirit and scope of the invention. The invention is limited only by the following claims and their equivalents.

What is claimed is:

1. A lime slaker comprising:

a feeder to dispense a metered flow of calcium oxide;

a water source to provide a metered flow of water;

an eductor receiving the metered flow of calcium oxide from the feeder and the metered flow of water from the water source and mixing the calcium oxide and water to form calcium hydroxide slurry;

a deaerating sump receiving said calcium hydroxide slurry from said eductor and retaining said calcium hydroxide slurry until a substantial percentage of a slaking reaction takes place;

a slurry pump to pump said slurry from said deaerating sump into a serpentine centrifugal mixer; and discharge means for discharging said calcium hydroxide slurry.

2. A lime slaker as recited in claim 1, wherein said discharge means is capable of discharging said calcium hydroxide slurry into said deaerating sump, allowing the recirculation of calcium hydroxide slurry.

3. A lime slaker as recited in claim 1, wherein said feeder is a vibrating screw feeder.

4. A lime slaker as recited in claim 1, further comprising a surge bin to receive calcium oxide and disperse said calcium oxide into said feeder.

5. A lime slaker as recited in claim 1, further comprising a mobile frame.

6. A method of slaking lime, comprising the steps of:

providing a metered flow of calcium oxide and water into an eductor to form calcium hydroxide slurry;

discharging said calcium hydroxide slurry into a deaerating sump;

retaining said calcium hydroxide slurry in said deaerating sump until a substantial percentage of a slaking reaction takes place;

pumping said calcium hydroxide slurry from said deaerating sump into a serpentine centrifugal mixer;

discharging said calcium hydroxide slurry from said serpentine centrifugal mixer.

* * * * *